(12) United States Patent
Inoue et al.

(10) Patent No.: US 6,380,984 B1
(45) Date of Patent: Apr. 30, 2002

(54) DIGITAL TELEVISION BROADCAST RECEIVING APPARATUS

(75) Inventors: Hajime Inoue, Chiba; Sunao Furui, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/255,522

(22) Filed: Feb. 22, 1999

(30) Foreign Application Priority Data

Feb. 24, 1998 (JP) .......................................... 10-041994

(51) Int. Cl.$^7$ ................................................ H04N 5/50
(52) U.S. Cl. ........................ 348/569; 348/563; 348/567; 348/568; 348/725; 348/726; 348/906; 725/39; 725/40; 725/70
(58) Field of Search ................................ 348/569, 563, 348/567, 568, 725–728, 906, 461; 725/39, 40, 56, 151, 152, 131, 70; H04N 5/50

(56) References Cited

U.S. PATENT DOCUMENTS

| 5,325,196 | A | * | 6/1994 | Yoshimi et al. | 348/180 |
|---|---|---|---|---|---|
| 5,661,526 | A | * | 8/1997 | Hamamoto et al. | 348/460 |
| 5,805,235 | A | * | 9/1998 | Bedard | 348/564 |
| 5,808,694 | A | * | 9/1998 | Usui et al. | 348/569 |
| 5,978,012 | A | * | 11/1999 | Ozawa et al. | 380/227 |
| 6,031,577 | A | * | 2/2000 | Ozkan et al. | 348/465 |
| 6,037,995 | A | * | 3/2000 | Ichifuji et al. | 348/906 |
| 6,037,998 | A | * | 3/2000 | Usui et al. | 348/569 |
| 6,072,548 | A | * | 6/2000 | Schoner et al. | 345/520 |
| 6,075,570 | A | * | 6/2000 | Usui et al. | 348/569 |
| 6,111,612 | A | * | 8/2000 | Ozkan et al. | 348/465 |
| 6,118,498 | A | * | 9/2000 | Reitmeier | 348/725 |
| 6,169,543 | B1 | * | 1/2001 | Wehmeyer | 345/721 |
| 6,239,794 | B1 | * | 5/2001 | Yuen et al. | 348/565 |
| 6,256,071 | B1 | * | 7/2001 | Hiroi | 348/553 |
| 6,321,385 | B1 | * | 11/2001 | Ozawa et al. | 380/227 |
| 2001/0049720 | A1 | * | 12/2001 | Eyer | 709/203 |

* cited by examiner

Primary Examiner—Michael Lee
Assistant Examiner—Linus H. Lo
(74) Attorney, Agent, or Firm—Lerner, David, Littenberg, Krumholz & Mentlik, LLP

(57) ABSTRACT

A decoder has a DRAM used as a work area in processing such as decompression and an MPEG decoder including an OSD processing unit. The MPEG decoder has a function to decompress data completing MPEG compression and a graphic function to display information such as an EPG (Electronic Program Guide). A control unit generates display data from presentation information conveyed by a digital television broadcast by using the OSD processing unit employed in the MPEG decoder and the DRAM in order to display the presentation information.

With such a decoder, it is possible to provide a receiver with a new function to use presentation information conveyed by a digital television broadcast without entailing an increase in cost.

9 Claims, 5 Drawing Sheets

F I G. 2
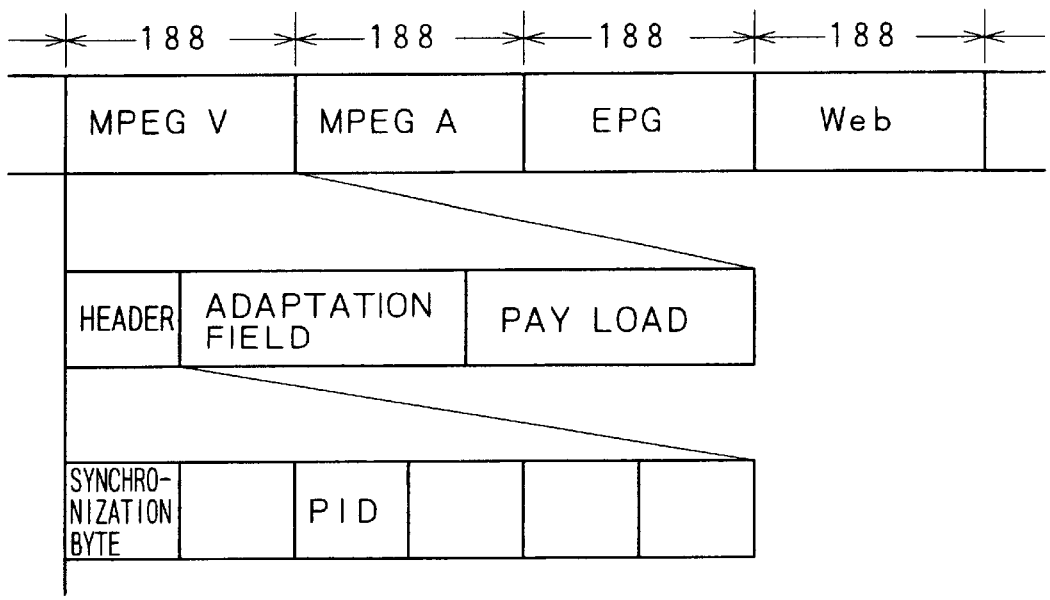
F I G. 3
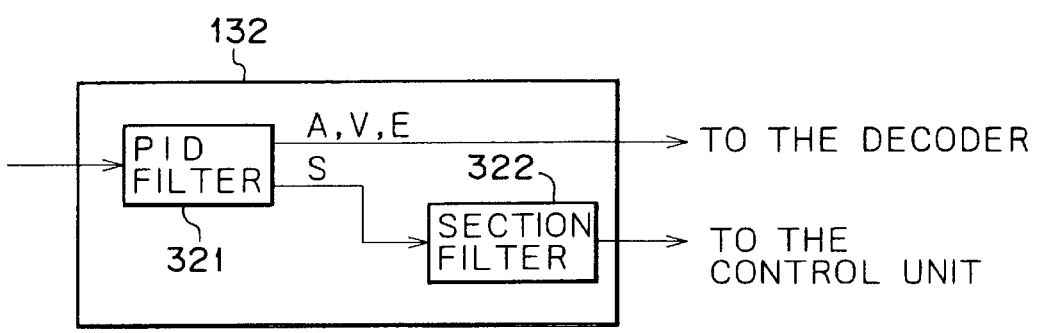

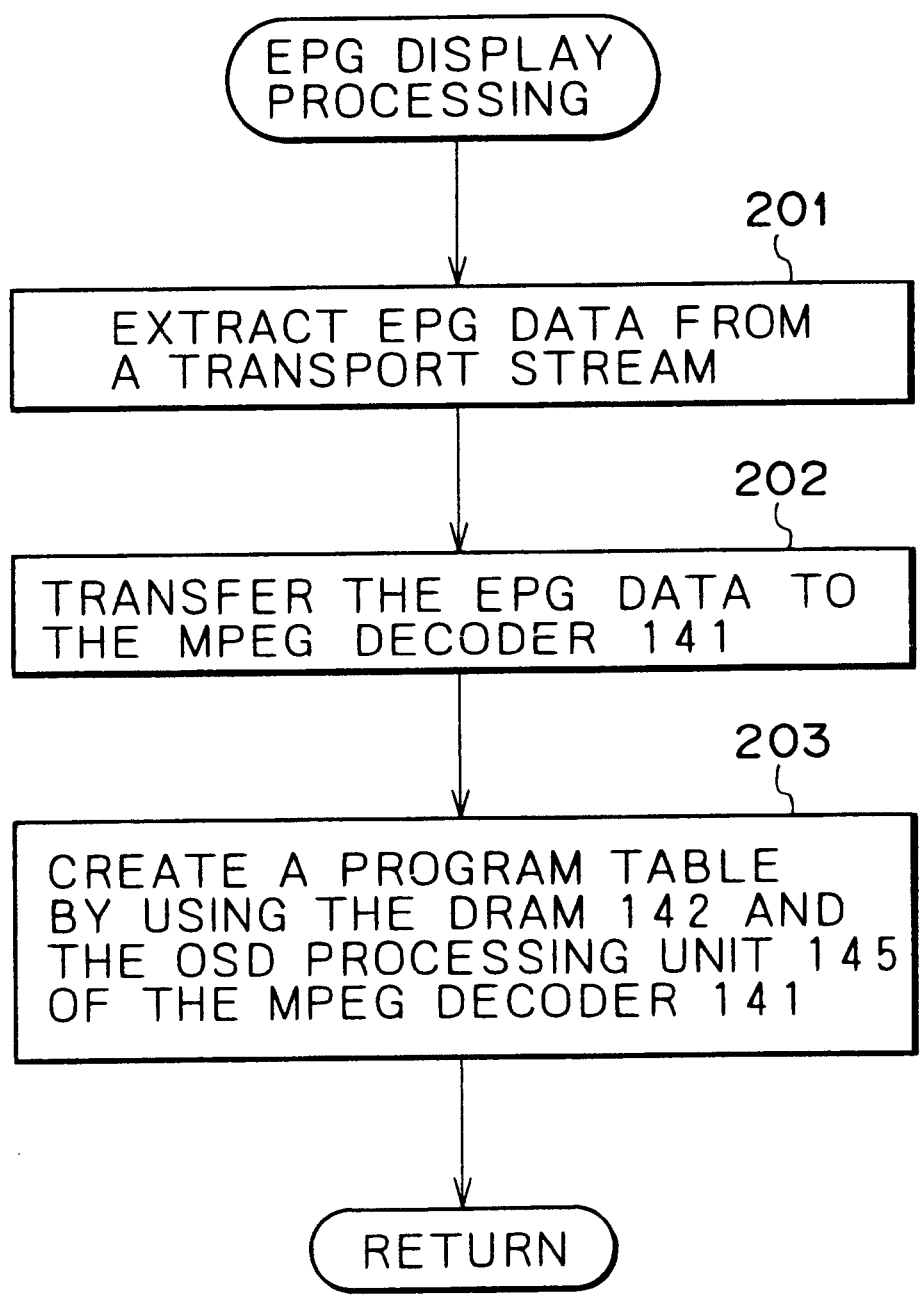

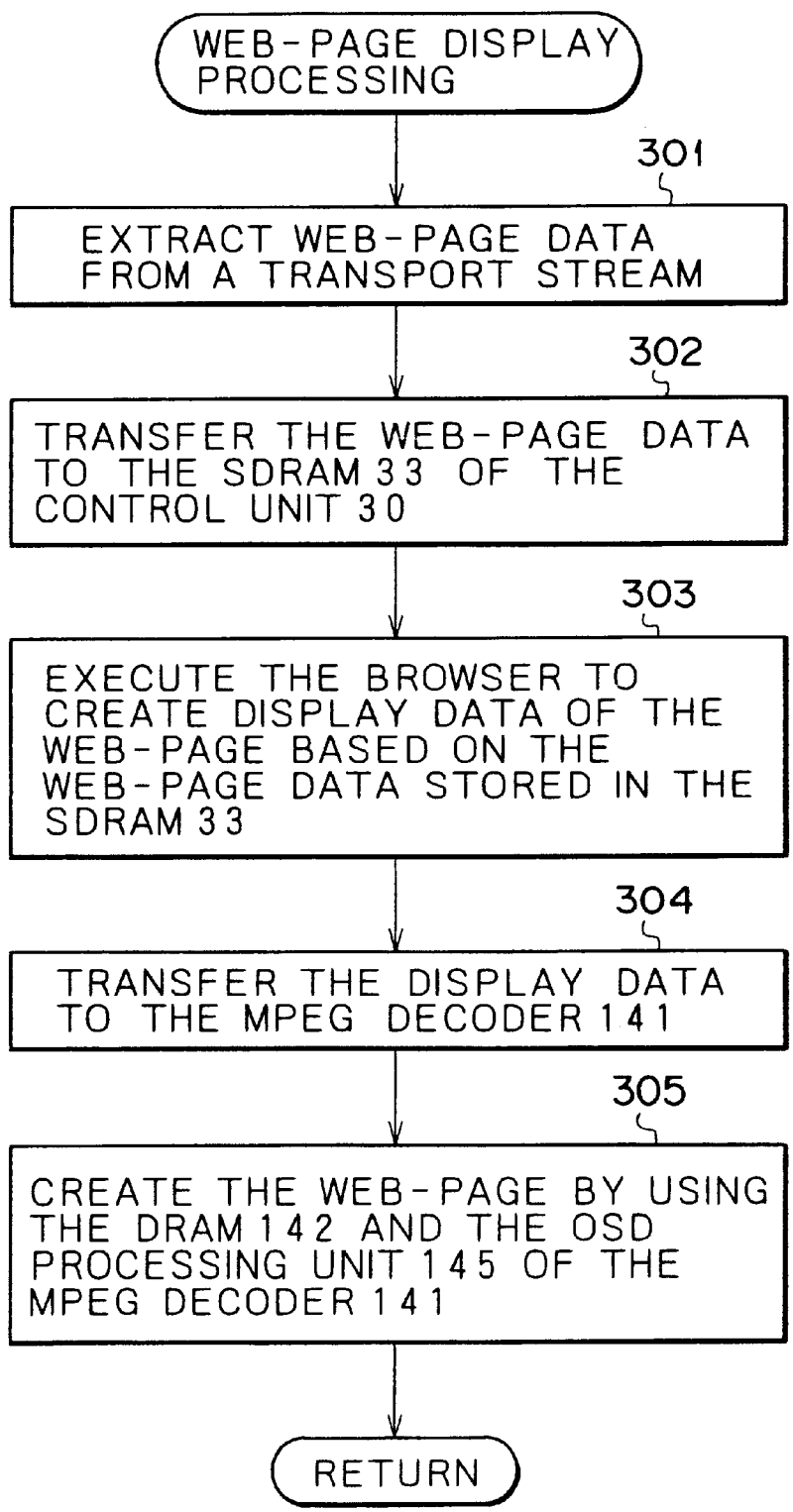

DIGITAL TELEVISION BROADCAST RECEIVING APPARATUS

BACKGROUND OF THE INVENTION

The present invention relates to a digital-television-broadcast receiving apparatus for receiving digital television broadcasts such as digital satellite broadcasting service.

As a television broadcasting system using a stationary satellite, a digital broadcasting system has been introduced in addition to an analog broadcasting system. The digital broadcasting system is capable of presenting a plurality of signals each representing a television broadcast program, in which a plurality of signals compressed by using typically an MPEG technique, are multiplexed into one carrier.

A digital-television-broadcast receiving apparatus selects a carrier conveying multiplexed television broadcasting programs, which a user desires to watch, in accordance with a command issued by the user. Then, the selected carrier is demodulated to generate a transport stream in which pieces of compressed data of a plurality of television broadcast programs are multiplexed.

Compressed data of a desired television broadcast program is then extracted from the transport stream. Subsequently, the extracted compressed data of the desired television broadcast program is decompressed and, then, an analog output video signal and an analog output audio signal are generated from digital data obtained as a result of the decompression. The analog output video signal and the analog output audio signal are used to reproduce images and sounds of the desired television broadcast program.

By the way, in recent years, the digital television broadcasting system using a stationary satellite also allows various kinds of digital data of the so-called web pages or homepages and the so-called game programs to be broadcasted to the user by inserting them into a broadcast signal. A web page and a game program are described in a special language such as an HTML (Hyper Text Makeup Language) or a language known as the MHEG (Multimedia and Hypermedia Information Coding Experts Group).

However, received digital data of a web page or a game program can not be utilized without further processing the data. In the case of a web page described in a special language such as the HTML, for example, the presented web page is analyzed by using software known as the so-called browser to produce display data for displaying the web page. To put it in detail, a video signal for displaying the web page is generated from the display data before the web page can be displayed.

In order to receive and utilize information such as a web page presented by the digital television broadcasting system by means of a digital-television-broadcast receiving apparatus, it is necessary to provide the digital-television-broadcast receiving apparatus with a graphic processing unit and a buffer memory. The graphic processing unit generates a video signal for displaying a web page from display data produced by the browser. Besides, used in processing to display a web page, the buffer memory has a storage capacity large enough for storing an image of the volume of at least one screen.

As described above, a graphic processing unit and a buffer memory are newly required in order to utilize information such as a web page presented by the digital television broadcasting system. In this case, the digital-television-broadcast receiving apparatus becomes expensive, increasing the magnitude of a load to be borne by the user.

SUMMARY OF THE INVENTION

The present invention provides a digital-television-broadcast receiving apparatus capable of implementing a new function of utilizing new information presented by a digital television broadcasting system without increasing the cost of the apparatus.

According to one aspect of the present invention, there is provided a digital-television-broadcast receiving apparatus including a tuner for selecting a carrier-wave component including a signal of a broadcast program selected by a command issued by the user, a front-end unit for demodulating the carrier-wave component selected by the tuner and outputting a transport stream, a selected-program extracting unit for extracting compressed data of the broadcast program selected by the command issued by the user from the transport stream output by the front-end unit, a decompression unit for decompressing the compressed data extracted by the selected-program extracting unit and for outputting a signal for presenting the selected broadcast program, a graphic processing unit for generating a signal for presenting an image based on input data by conversion of the input data into display data such as characters, figures and symbols provided in advance, and a working memory with a storage capacity large enough for storing image data of the volume of at least one screen to be shared by the decompression unit and the graphic processing unit as a storage unit common to the decompression unit and the graphics processing unit. The digital-television-broadcast receiving apparatus, wherein the selected-program extracting unit is capable of extracting presentation information included in the transport stream in accordance with a command issued by the user, a data converting unit receives the presentation information extracted by the selected-program extracting unit, converts the presentation information into input data with a format acceptable to the graphic processing unit and supplies the input data to the graphic processing unit, and the graphic processing unit generates image data for presenting images for the presentation information from the input data converted by the data converting unit by using the working memory as a work area.

In the digital-television-broadcast receiving apparatus provided by the present invention as described above, the selected carrier-wave component (the carrier) of a digital television broadcast conveys multiplexed presentation information such as compressed data of a plurality of broadcast programs, web pages and game programs other than compressed data of a television broadcast program. The carrier of the digital television broadcast is supplied to the front-end unit for demodulating the carrier to produce a transport stream, which is then supplied to the selected-program extracting unit.

The selected-program extracting unit extracts compressed data of a television broadcast program and presentation information other than the television broadcast program from the transport stream in accordance with a command issued by the user. Assume that a user selects a desired television broadcast program. In this case, the selected-program extracting unit extracts compressed data of the selected television broadcast program, supplying the compressed data to the decompression unit. The decompression unit decompresses the compressed data by using the working memory as a work area in order to play back and output the television broadcast program selected by the user.

When the user selects presentation information other than the television broadcast program, on the other hand, the selected-program extracting unit extracts the selected presentation information, supplying the desired presentation information to the data converting unit. The data converting unit converts the presentation information into input data with a format acceptable to the graphic processing unit, supplying the input data to the graphic processing unit.

The graphic processing unit generates a video signal for displaying images for the presentation information from the input data received from the data converting unit by using the working memory as a work area.

It is thus possible to generate a video signal for displaying images for presentation information other than a television broadcasting program by using the working memory used in the decompression processing and to display the images for the presentation information to the user.

In this way, it is possible to display images for presentation information conveyed by a digital television broadcast without the need to newly install a dedicated working memory. Thus, since it is possible to utilize presentation information conveyed by a digital television broadcast without the need to newly install a dedicated working memory, the cost of the apparatus for receiving digital television broadcasts does not rise.

According to another aspect of the present invention, in the digital-television-broadcast receiving apparatus described above, the transport stream includes multiplexed program-table data for displaying a program table showing a plurality of broadcasting programs multiplexed in the transport stream, the selected-program extracting unit extracts the program-table data from the transport stream in accordance with a command issued by the user and supplies the program-table data to the graphic processing unit, and the graphic processing unit converts the program-table data into display data in order to generate image data for displaying the program table.

As described above, in addition to compressed data of a plurality of television broadcasting programs and presentation information which are multiplexed in the carrier of a digital television broadcast, the carrier also conveys typically multiplexed program-table data for displaying a program table showing a plurality of television broadcasting programs.

The selected-program extracting unit is also capable of extracting program-table data selected by a command issued by the user. Program-table data extracted by the selected-program extracting unit is supplied to the graphic processing unit. The graphic processing unit generates a signal for displaying a program table from the program-table data by using the working memory as a work area. As a result, the program table is displayed and presented to the user.

As described above, the graphic processing unit and the working memory are used in processing to display a program table. Thus, the working memory is used not only in decompression processing, but also in processing to display presentation information or a program table. In addition, the graphics processing circuit can also be used in both the processing to display presentation information and a program table.

As a result, it is not necessary to provide separate work areas for the compression processing and processing to display presentation information and a program table. By the same token, it is also not necessary to provide separate graphics processing units for the processing to display presentation information and a program table.

For the above reason, the configuration of the apparatus for receiving digital television broadcasts can be made simple and the cost of the apparatus can be prevented from rising.

According to still another aspect of the present invention, in the digital-television-broadcast receiving apparatus as described, the presentation information is described in a predetermined language, and the data converting unit carries out processing to analyze the presentation information to generate input data with a format acceptable to the graphic processing unit from the presentation information.

An example of the presentation information described in the predetermined language is a web page described in the HTML. Such a web page is conveyed by a digital television broadcast.

Assume that the user issues a command to use, for example, a selected web page, a sort of presentation information which is conveyed by a digital television broadcast to a user. In this case, the selected-program extracting unit extracts web data which forms a web page, supplying the data to the data converting unit. In the data converting unit, the web data is subjected to an HTML analysis, being converted into input data with a format acceptable to the graphic processing unit. The graphic processing unit then generates a signal for displaying the web page from the input data received from the data converting unit.

In this way, images of presentation information described in a predetermined language such as a web page can be reproduced as an output that can be utilized by the user. In this case, since neither dedicated working memory nor dedicated graphic processing unit for displaying the presentation information is needed as described above, the cost of the apparatus for receiving digital television broadcasts can be prevented from rising and the facility for utilizing presentation information can be implemented relatively with ease.

According to a further aspect of the present invention, in the digital-television-broadcast receiving apparatus described above, the presentation information is a program including image information, and the data converting unit executes the program to generate input data with a format acceptable to the graphic processing unit using the image information.

For example, a program including image information such as a game program is conveyed by a digital television broadcast as presentation information.

Assume that the user issues a command to use for example a selected game program, which is a sort of presentation information conveyed by a digital television broadcast. In this case, the selected-program extracting unit extracts the desired game program, supplying the game program to the data converting unit. In the data converting unit, the game program is executed to generate input data with a format acceptable to the graphic processing unit using image information included in the game program. The input data is subsequently supplied to the graphic processing unit which then generates a signal for displaying images for image information included in the game program.

In this way, images used in a game program can be played back and output by execution of the game program. That is to say, by executing a game program, a game presented by a game program can be enjoyed.

In this case, since neither dedicated working memory nor dedicated graphic processing unit for displaying the presentation information is needed as described above, the cost of the apparatus for receiving digital television broadcasts can be prevented from rising and the facility for utilizing presentation information including image information such as a game program can be implemented relatively with ease.

According to a still further aspect of the present invention, the digital-television-broadcast receiving apparatus described above is further provided with a connector for connecting an external memory, and an interface circuit for fetching information from the external memory connected to the connector by way of the connector, wherein the data converting unit executes a program loaded from the external memory connected to the connector for generating input data with a format acceptable to the graphic processing unit from the presentation information extracted by the selected-program extracting unit in order to generate the input data.

As described above, in order to generate input data with a format acceptable to the graphic processing unit from presentation information extracted by the selected-program extracting unit, a program to be executed by the data converting unit is loaded from the external memory connected to the connector by way of the interface circuit.

As a result, even in the case of a digital-television-broadcast receiving apparatus without a program for generating input data with a format acceptable to the graphic processing unit from presentation information, the required function of such a program can be added by using an external memory which stores the program. In this way, a function to utilize presentation information conveyed by a digital television broadcast can be added with ease.

BRIEF DESCRIPTION OF THE DRAWINGS

FIG. 2 is a diagram used for explaining a transport stream of a digital broadcast;

FIG. 3 is a block diagram used for explaining a demultiplexer employed in the digital-television-broadcast receiving apparatus shown in FIG. 1;

FIG. 5 shows a flowchart representing processing to display an EPG; and

FIG. 6 shows a flowchart representing processing to display a web page.

DETAILED DESCRIPTION OF THE PREFERRED EMBODIMENTS

Preferred embodiments implementing a digital-television-broadcast receiving apparatus provided by the present invention are described by referring to accompanying diagrams as follows. In the case of a digital television broadcast, signals of a plurality of broadcast programs may be multiplexed in a carrier. Thus, in the following description, an embodiment implementing a digital-television-broadcast receiving apparatus is assumed to be capable of receiving a signal conveyed by a carrier in which signals of a plurality of broadcast programs are multiplexed, demodulating the received signal, extracting the signal of a desired broadcast program and utilizing the extracted signal.

Figure 1:
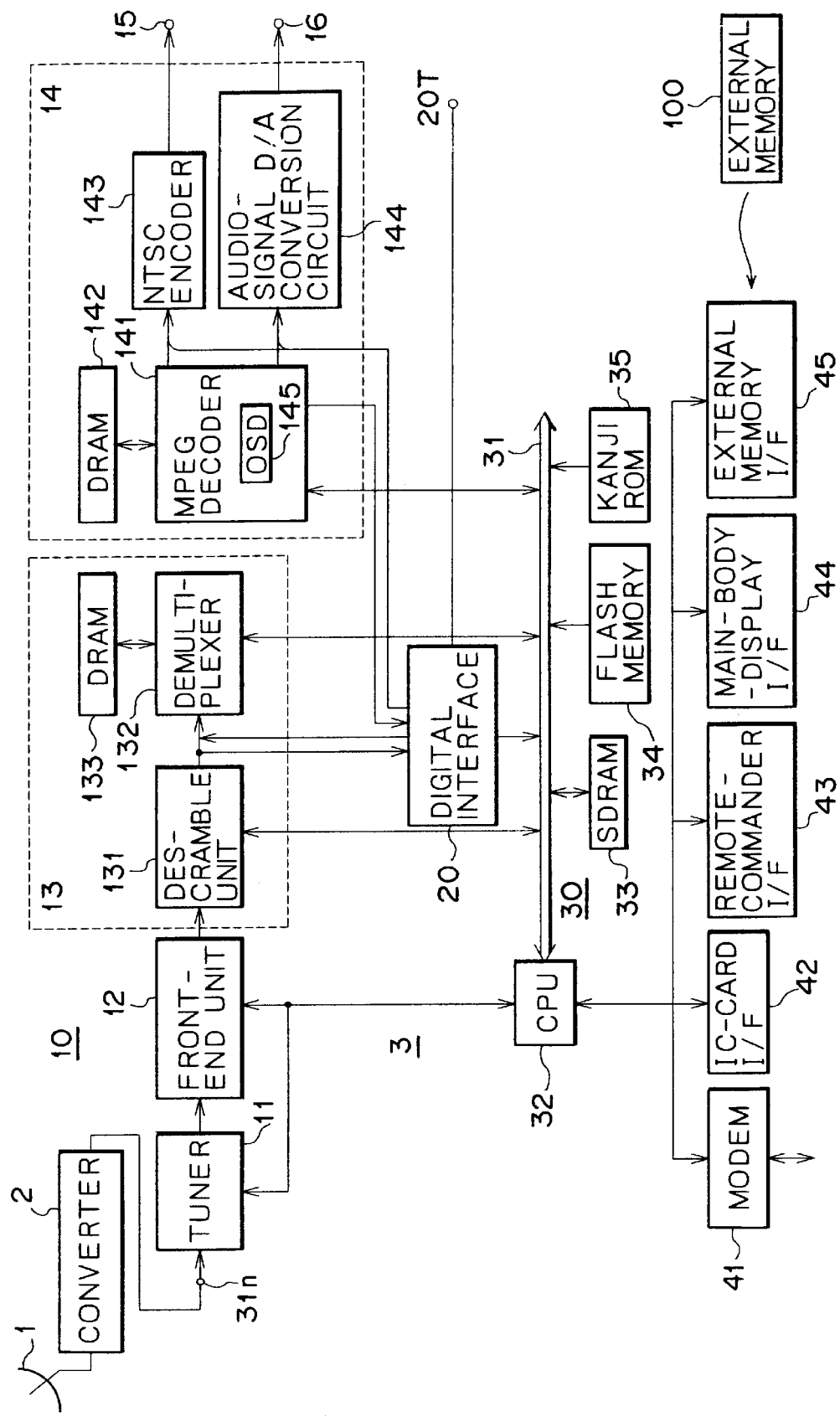
FIG. 1 is a block diagram used for explaining an embodiment implementing a digital-television-broadcast receiving apparatus provided by the present invention.

FIG. 1 is a block diagram used for explaining an embodiment implementing a digital-television-broadcast receiving apparatus 3 which is referred to hereafter simply as a receiver. In the receiver 3 shown in FIG. 1, a satellite broadcasting wave of a bandwidth of 12 GHz received by a receiving antenna 1 is converted into an intermediate-frequency signal with a bandwidth of 1 GHz by a low-noise converter 2 in a frequency conversion process. The intermediate-frequency signal is then supplied to the receiver 3 implemented by the present embodiment by way of an input terminal 31N.

The receiver 3 implemented by the present embodiment includes three major components, namely, a received-signal processing unit 10, a digital interface 20 for exchanging digital data with the received-signal processing unit 10 and a control unit 30. The received-signal processing unit 10 comprises a tuner 11, a front-end unit 12, a transport unit 13 and a decoder 14. As will be described later, the received-signal processing unit 10 carries out processing such as demodulation of a selected received carrier to generate video and audio signals for playing back a broadcast program selected by a command issued by the user.

The control unit 30 is implemented by a microcomputer including a CPU 32, an SDARM 33, a flash memory 34 and a kanji ROM 35 which are connected to each other by a bus 31. The control unit 30 controls each component employed in the receiver 3. The SDRAM 33 serves as a work area for various kinds of processing carried out by the control unit 30. The flash memory 34 is used for storing processing programs executed by the control unit 30 and data used in the various kinds of processing carried out by the control unit 30. The kanji ROM 35 is used for storing font data for display such as characters and symbols including kanji font data.

As shown in FIG. 1, the control unit 30 is further connected to a modem 41, an IC-card interface 42 (referred to as an "IC-card I/F" in FIG. 1), a remote-commander interface 43 (referred to as a "remote commander I/F" in FIG. 1), a main-body-display interface 44 for interfacing with a fluorescent display tube provided on the main body and an external-memory interface 45 (referred to as an "external-memory I/F" in FIG. 1).

An interface with the modem 41, the IC-card interface 42, the remote-commander interface 43, the main-body-display interface 44 and the external-memory interface 45 are implemented by a so-called gate array which is built in a single LSI chip. By implementing a plurality of different interfaces as a gate array in this way, low cost interfaces can be attained for mounting on the receiver 3 implemented by the embodiment.

In this embodiment, the tuner 11 is a tuner adopting the so-called synthesizer system. PLL data, that is, division ratio data obtained as a result of frequency division of a variable division circuit of a PLL-loop type, is supplied to the tuner 11 as a station-selecting control signal. The control unit 30 has a memory for storing PLL data for each channel. It should be noted that this memory is not shown in the figure.

The tuner 11 selects one carrier among a plurality of carriers included in an intermediate-frequency signal received from the input terminal 31N accordance with PLL data received from the control unit 30 as a station-selecting control signal. The carrier to be selected is determined by a remote-commander signal which represents a channel-selecting command received from a remote commander not shown in the figure. The channel-selecting command is entered by the user by operating the remote commander.

That is to say, when the user enters a channel-selecting command by operating the remote commander, a remote-commander signal representing the channel-selecting command is output by the remote commander. The remote-commander signal is received by the control unit 30 employed in the receiver 3 through the remote-commander interface 43 connected to the control unit 30. Then, PLL data representing the remote-commander signal is transferred from the control unit 30 to the tuner 11. In addition, a channel-selecting command can also be entered by the user by operating an operation button provided on the receiver 3 itself. It should be noted that this operation button is also not shown in the figure.

A signal output by the tuner 11 is supplied to the front-end unit 12 which is constituted with components such as an A/D converter, a demodulator, a channel equalizer and an error correcting decoder. The front-end unit 12 converts the signal received from the tuner 11 into a digital signal and then carries out digital demodulation.

Subsequently, the front-end unit 12 carries out the so-called ghost-cancel process based on control information supplied from the control unit 30 on a signal obtained as a result of the digital demodulation and, at the same time, corrects a bit error generated on a transmission line, producing a transport-stream output. In the case of a satellite digital television broadcast, an error correction code is included to sustain a high and stable reception quality even for reception at a low C/N ratio due to causes such as a rain. Typically, a Viterbi code and a Reed. Solomon code is used whereas a trellis coding modulation system is adopted.

The transport-stream output obtained as a result of the demodulation and the error correction carried out by the front-end unit 12 is supplied to the transport unit 13. In most cases, the transport stream is a scrambled signal which restricts reception of the signal to only those who pay.

As shown in FIG. 1, the transport unit 13 includes a descramble unit 131, a demultiplexer 132 and a DRAM 133 used as a work area in descramble processing. A transport stream output by the front-end unit 12 is supplied to the descramble unit 131 employed in the transport unit 13. In the descramble unit 131, the transport-stream signal is descrambled to resolve the scrambling.

In the descramble unit 131, in order to descramble the transport-stream signal, an IC-card is given to a user by a broadcasting company providing a digital television broadcast according to a contract is connected to the IC-card interface 42. This IC-card contains information such as contract terms and data unique to the user. The information such as contract terms and data unique to the user can be updated typically by communication with a billing service center of the broadcasting company through the modem 41.

Then, a descramble key presented by the broadcasting company as data multiplexed in the transport stream as described later is extracted by the demultiplexer 132 and supplied to the control unit 30. The scramble key is essential one of pieces of data required to accomplish the restricted reception. Upon receiving the descramble key, the control unit 30 forms a judgment as to whether or not the transport-stream signal supplied thereto is authorized to carry out descramble processing by the receiver 3, in conformity with the contracted user information stored in IC-card. If the outcome of the judgment indicates that the operation to descramble the transport-stream signal carried out by the receiver 3 is legal, the descramble key received from the demultiplexer 132 is supplied to the descramble unit 131 to be used in the operation to descramble the transport-stream signal.

The descrambled transport stream which has a form in which a number of programs are multiplexed is supplied to the demultiplexer 132. The transport stream is also supplied to the digital interface 20 so that the transport stream can be passed on to external digital equipment as will be described later.

FIG. 2 is a diagram used for explaining the configuration of the transport stream in which a number of programs are multiplexed. As shown in the figure, the transport stream is a string of bits defined by the MPEG system. To be more specific, the transport stream is a set of packets, strictly speaking, transport packets, each having a fixed length of 188 bytes.

Each of the transport packets comprises a header, an adaptation field for holding additional information unique to the packet and a pay load representing the main contents of the packet. The pay load is data selected for use by the user. To be more specific, the pay load can be MPEG V, MPEG A and various kinds of data such as the so-called web page or the so-called game program which is described typically in the HTML and the MHEG. MPEG V and MPEG A are respectively a video signal and an audio signal which have completed MPEG compression. It should be noted that, in FIG. 2, the various kinds of data are denoted by the notation Web.

In addition, transport packets for storing data used for controlling the selection of a station, data required to implement the restricted reception such as the descramble key and service information data for implementing an EPG (Electronic Program Guide) are multiplexed with transport packets each for storing program data. That is to say, a transport stream comprises packets containing data of a plurality of programs multiplexed with packets containing, among others, data and service information having something to do with program selection and restricted reception.

The header of each transport packet comprises 4 bytes with the first byte used as a synchronization byte. The other bytes of the header are used for conveying data such as a packet ID (PID) used as information identifying the packet and control information indicating whether or not the scramble process was carried out, a subsequent adaptation field and control information indicating whether or not a pay load exists.

Then, the demultiplexer 132 carries out a demultiplexing process in accordance with a program select command entered by the user via the remote commander of the control unit 30 and supplied to the control unit 30 by way of the remote-commander interface 43. The demultiplexing process separates and extracts necessary packets containing, among other information, an MPEG-compressed video signal of a program selected by the user, an audio signal of the program also completing MPEG compression, data having something to do with the selection of the program and the restricted reception and service information data.

FIG. 3 is a block diagram used for explaining the demultiplexer 132. As shown in the figure, the demultiplexer 132 comprises a PID filter 321 and a section filter 322. The PID filter 321 separates and extracts various kinds of information S such as an MPEG-compressed video signal V and an MPEG-compressed audio signal A of a program selected by the user, EPG data E representing an EPG and data having something to do with selection of the program and the restricted reception in accordance with a PID added to the header of each transport packet.

Then, the MPEG-compressed video signal V, the MPEG-compressed audio signal A of the program selected by the user or the EPG data E is supplied to the decoder 14. On the other hand, the rest of the data S is supplied to the section filter 322 for separating and extracting required information such as data having something to do with selection of the program and the restricted reception to be supplied to the control unit 30.

As described above, a digital television broadcast is presented as information such as a web page or a game program described in a predetermined language such as the HTML, video and audio signals of programs and EPG data in a multiplexed form. When the user issues a command to use presentation information other than the signal of such a television program, the PID filter 321 employed in the receiver 3 implemented by the embodiment extracts the requested information from the transport stream and supplies the extracted information to the control unit 30 by way of the section filter 322 to be temporarily stored in the SDRAM 33.

In addition, data such as a web page and a game program is analyzed by the control unit 30 to be used by the user as will be described later.

It should be noted that the demultiplexer 132 also generates a program clock reference based on synchronization bits. The program clock reference serves as a reference of an operation to play back video and audio signals.

As shown in FIG. 1, the decoder 14 comprises an MPEG decoder 141, a DRAM 142 used as a work area of processing such as MPEG decoding, an NTSC encoder 143 and an audio-signal D/A conversion circuit 144.

As described above, video and audio signals of a program selected by the user have completed MPEG compression. For this reason, the MPEG decoder 141 carries out decompression or MPEG decode processing on the MPEG-compressed video and audio signals received from the demultiplexer 132.

The MPEG decoder 141 has an OSD (On Screen Display) processing unit 145 which allows an EPG or a menu to be displayed typically on a image of a program.

In addition, presentation information such as a web page requested by the user as will be described later in detail is also played back by using the OSD processing unit 145 and the DRAM 142 to be displayed to the user.

As described above, the MPEG decoder 141 employed in the receiver 3 implemented by the embodiment has a decompression unit for carrying out decompression and the OSD processing unit 145 for carrying out graphic processing.

The decompressed video signal or a video signal for displaying information such as an EPG is supplied to the NTSC encoder 143 for converting the video signal into an analog video signal of the NTSC format. The analog video signal of the NTSC format is then supplied to a monitor receiver by way of the external output terminal 15 to be displayed on the screen of the monitor receiver.

On the other hand, the decompressed audio signal is supplied to the audio-signal D/A-conversion circuit 144 for converting the signal into an analog audio signal. The analog audio signal is then supplied typically to a speaker of the monitor receiver for outputting the sound by way of the external-output terminal 16.

In addition, the MPEG decoder 141 employed in this embodiment also supplies a digital audio signal (a PCM audio signal) obtained as a result of decompression and the transport stream to the digital interface 20 to be passed on to external equipment.

The digital interface 20 forms output information from data processed by the receiver 3 implemented by the embodiment, supplying the output information to external digital equipment by way of an external input/output terminal 20T. The digital interface 20 also carries out reception processing on data supplied by external digital equipment by way of the external input/output terminal 20T so that the data can be processed by the receiver 3. In this way, the digital interface 20 of the embodiment serves as an interface of a digital signal output by the receiver 3 to external digital equipment and a digital signal supplied by the external digital equipment to the receiver 3.

In the case of the receiver 3 implemented by the embodiment, the input/output terminal 20T conforms to IEEE 1394 specifications, that is, interface standards determined by the IEEE (Institute of Electrical and Electronics Engineers). By using the input/output terminal 20T, digital data can be exchanged with external equipment such as a DVTR, a hard disc drive capable of recording and playing back digital video and audio signals and an MD drive. A hard disc drive capable of recording and playing back digital video and audio signals is referred to as an AVHDD.

The digital interface 20 of the embodiment is capable of outputting either a transport stream or a digital audio signal to external equipment by way of the input/output terminal 20T under control executed by the control unit 30 in accordance with a command issued by the user.

In addition, the receiver 3 implemented by the embodiment allows an external memory 100 to be connected to or disconnected from the external-memory interface 45. For this reason, the external-memory interface 45 comprises a connector for physically connecting the external memory 100 and an interface circuit for exchanging data with the external memory 100.

In addition, the external-memory interface 45 employed in the receiver 3 implemented by the embodiment can also be connected to or disconnected from various kinds of electronic equipment including an external memory 100 such as a flash memory which allows data stored therein to be updated.

The external memory 100 is used for storing various kinds of digital data such as a program, video data and audio data to be read out and utilized when necessary. Information stored at a predetermined location such as the header of the external memory 100 indicates what data is stored therein.

Data stored in the external memory 100 connected to the external-memory interface 45 employed in the receiver 3 implemented by the embodiment is fetched to enhance functions of the receiver 3. In addition, the receiver 3 is also capable of outputting video and audio data obtained as a result of an operation to play back data from the external memory 100.

On the other hand, the receiver 3 implemented by the embodiment is capable of receiving various kinds of information conveyed by a digital television broadcast and storing the information into the external memory 100.

Displaying Information Such As a Web Page

As described earlier, the receiver 3 implemented by the embodiment with the configuration described above is capable of extracting EPG data or web data written in the HTML to form an EPG or a web page which are presented in a form multiplexed with a signal of a television broadcast program in a carrier and displaying an EPG or a web page based on the EPG data and the web data respectively.

A signal for displaying an EPG can be formed from EPG data representing the EPG. To put it in detail, a signal for displaying an EPG can be formed from EPG data separated and extracted by the demultiplexer 132 and the EPG can be displayed by using the OSD processing unit 145 and the DRAM 142 employed in the decoder 14 as described above.

Described in a language such as the HTML, on the other hand, web data for creating a web page is analyzed by using software such as the so-called browser to generate display data for displaying the web page. Otherwise, the web page can not be displayed.

Thus, in order to display a web page, it is necessary to create display data for displaying a web page by using the browser and to generate a video signal for displaying the web page on the basis of the display data for displaying the web page by using the graphic processing unit. In addition, a working memory with a size large enough for storing video information of the amount of at least 1 screen used in the graphic processing to generate a video signal for displaying the web page is also required.

In the case of this receiver 3, however, the MPEG decoder 141 is provided with the aforementioned OSD processing unit 145 for displaying information such as an EPG as will be described later. In addition, the decoder 14 has the DRAM 142 with a relatively large storage capacity used in decompression and display processing of the EPG.

The OSD processing unit 145 employed in the MPEG decoder 141 and the DRAM 142 are also used to display a presentation information presented through a digital television broadcast such as a web page. Thus, the presentation information such as a web page can be displayed without the need to provide a dedicated graphic processing unit and a dedicated buffer memory.

Next, processing carried out by the receiver 3 implemented by the embodiment to display presentation information is explained. The following description exemplifies reception of a web page as presentation information conveyed by a digital television broadcast. In the receiver 3 implemented by the embodiment, the processing to display an EPG or a web page is started by a command entered by the user.

Figure 4:
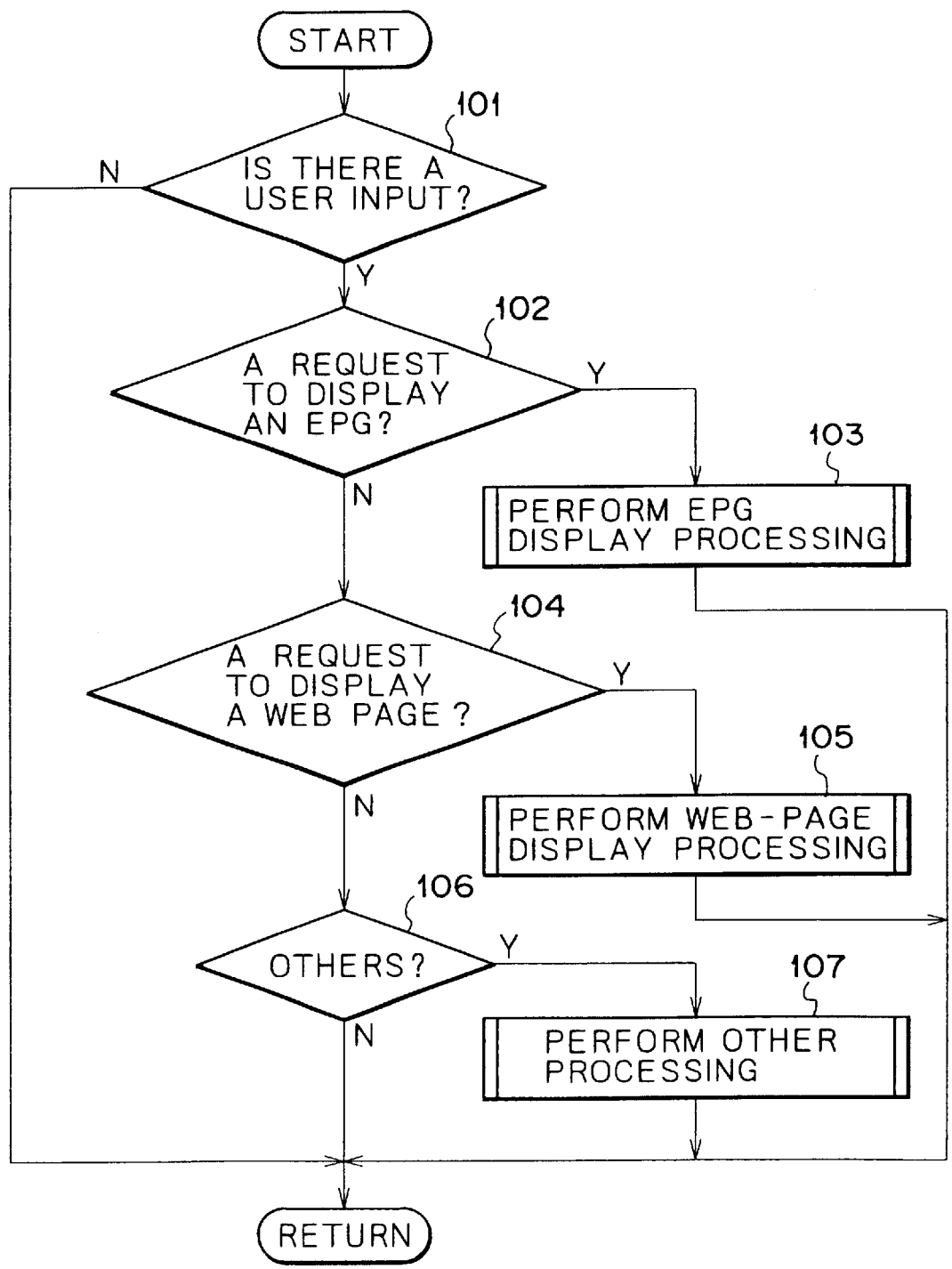
FIG. 4 shows a flowchart representing processing carried out by the digital-television-broadcast receiving apparatus for displaying an EPG or a web page in accordance with a command issued by a user.

FIG. 4 shows a flowchart representing processing carried out by the receiver 3 in order to display an EPG or a web page in accordance with a command issued by the user. In this embodiment, in order to use the receiver 3 to display an EPG or a web page, the user gives a command to the receiver. To be more specific, the user carries out a predetermined operation on a remote commander of the receiver 3 or an EPG-display button switch or a web-page-display button switch on an operation panel provided on the receiver 3. A control unit 30 of the receiver 3 then displays an EPG or a web page in accordance with the command issued by the user.

Thus, in order to properly process an input operation carried out by the user, a main routine of the receiver 3 implemented by the embodiment calls processing shown in FIG. 4 as the so-called interrupt processing at predetermined intervals after a power supply of the receiver 3 implemented by the embodiment is turned on.

The flowchart representing processing shown in FIG. 4 begins with a step 101 at which the control unit 30 employed in the receiver 3 forms a judgment as to whether or not the user has carried out an input operation by operating the remote commander of the receiver 3 or the operation panel of the receiver 3. If the outcome of the judgment formed at the step 101 indicates that the user has not carried out an input operation, the processing shown in FIG. 4 is terminated and control of execution is returned to the main program.

If the outcome of the judgment formed at the step 101 indicates that the user has carried out an input operation, on the other hand, the flow of the processing goes on to a step 102 to form a judgment as to whether or not the input operation is a command to display an EPG. If the outcome of the judgment formed at the step 102 indicates that the input operation carried out by the user is a command to display an EPG, the flow of the processing goes on to a step 103 at which the control unit 30 executes EPG display processing to be described later to display an EPG. Then, the processing shown in FIG. 4 is terminated and control of execution is returned to the main program.

If the outcome of the judgment formed at the step 102 indicates that the input operation carried out by the user is not a command to display an EPG, on the other hand, the flow of the processing goes on to a step 104 at which the control unit 30 forms a judgment as to whether or not the input operation is a command to display a web page.

If the outcome of the judgment formed at the step 104 indicates that the input operation carried out by the user is a command to display a web page, the flow of the processing goes on to a step 105 at which the control unit 30 executes web-page display processing to be described later to display a web page. Then, the processing shown in FIG. 4 is terminated and control of execution is returned to the main program.

If the outcome of the judgment formed at the step 104 indicates that the input operation carried out by the user is not a command to display a web page, on the other hand, the flow of the processing goes on to a step 106 at which the control unit 30 forms a judgment as to whether or not the input operation is a command to carry out other processing such as the use of a game program presented by a digital television broadcast.

If the outcome of the judgment formed at the step 106 indicates that the input operation carried out by the user is a command to carry out other processing, the flow of the processing goes on to a step 107 at which the control unit 30 executes a subroutine representing the requested other processing in order to carry out the other processing. Upon completion of the other processing, the processing shown in FIG. 4 is terminated and control of execution is returned to the main program. If the outcome of the judgment formed at the step 106 indicates that the input operation carried out by the user is not a command to carry out other processing, on the other hand, the processing shown in FIG. 4 is terminated and control of execution is returned to the main program.

As described above, the receiver 3 implemented by the embodiment is thus capable of playing back and outputting a television broadcast program presented by a digital television broadcast and, as described above, capable of playing back and displaying an EPG and a web page presented by a digital television broadcast as requested by the user.

FIG. 5 shows a flowchart representing the processing carried out at the step 103 of the flowchart shown in FIG. 4 described above to display an EPG. As shown in FIG. 5, the flowchart begins with a step 201 at which the control unit 30 controls the demultiplexer 132 to extract EPG data from a transport stream when the user carries out an operation determined in advance to display an EPG. The flow of the processing then goes on to a step 202 at which the EPG data is transferred to the decoder 14. Then, the flow of the processing proceeds to a step 203 at which the control unit 30 controls the OSD processing unit 145 employed in the decoder unit 14 to generate a signal for displaying the EPG on the basis of the EPG data received from the demultiplexer 132. The signal for displaying the EPG is then converted by the NTSC encoder 143 into an analog output video signal which is supplied to the monitor receiver by way of the output terminal 15. As a result, the EPG appears on the display screen of the monitor receiver. It should be noted that the DRAM 142 is used as a work area in the generation of the signal for displaying the EPG carried out by the OSD processing unit 145.

As described above, a video signal for displaying an EPG is generated by the OSD processing unit 145 employed in the decoder 14 by using the DRAM 142 as a work area on the basis of EPG data presented by a digital television broadcast. The EPG is typically used to select a television broadcast program presented by a digital television broadcast.

In addition, the receiver 3 implemented by the embodiment is capable of displaying and utilizing a web page presented by a digital television broadcast as will be described later without the need to provide a dedicated buffer memory and a dedicated graphic processing unit cited earlier.

FIG. 6 shows a flowchart representing the processing carried out at the step 105 of the flowchart shown in FIG. 4 described above to display a web page.

As shown in FIG. 6, the flowchart begins with a step 301 at which the control unit 30 controls the demultiplexer 132 to extract web data from a transport stream. The flow of the processing then goes on to a step 302 at which the extracted web data is supplied to the SDRAM 33 employed in the control unit 30 by way of the system bus 31 to be temporarily stored therein.

Then, the flow of the processing proceeds to a step 303 at which the control unit 30 executes a browser stored typically in the flash memory unit 34 in advance to carry out an HTML analysis on the web data temporarily stored in the SDRAM 33. The HTML analysis results in data for displaying a web page which is also stored typically in the SDRAM 33.

The flow of the processing then continues to a step 304 at which the control unit 30 transfers the created data for displaying a web page to the OSD processing unit 145 employed in the decoder 14 by way of the system bus 31. The data created by the control unit 30 for displaying a web page is data of the same format as the EPG data described earlier. The OSD processing unit 145 is capable of creating a video signal for displaying a web page from the data for displaying the web page. Thus, the control unit 30 has the function of a data converter for converting web data, a sort of presentation information, into data to be supplied to the OSD processing unit 145 with a format that can be processed by the OSD processing unit 145.

Then, the flow of the processing goes on to a step 305 at which the decoder 141 controls the OSD processing unit 145 to generate a signal for displaying the web page. To put it in detail, a video signal for displaying the web page is generated by the OSD processing unit 145 employed in the decoder 14 by using the DRAM 142 as a memory for a work on the basis of the data for displaying the web page received from the control unit 30. The signal for displaying the web page is then supplied to the NTSC encoder 143 to be converted thereby into an analog output video signal which is then supplied to the monitor receiver by way of the output terminal 15. As a result, the web page appears on the display screen of the monitor receiver.

As described above, the receiver 3 implemented by the embodiment generates data for displaying a web page by means of a browser from web data presented by a digital television broadcast. A video signal for displaying the web page is then generated by the OSD processing unit 145 employed in the decoder 14 by using the DRAM 142 as a work area on the basis of the data for displaying the web page received from the control unit 30. The video signal allows the web page presented by a digital television broadcast to be displayed and utilized.

That is to say, in the receiver 3 implemented by the embodiment, the DRAM 142 used as a work area by the OSD processing unit 145 employed in the decoder 14 in decompression of data and creation of a signal for displaying an EPG during an operation to display the EPG is used again in processing to generate a video signal for displaying a web page.

As described earlier, the OSD processing unit 145 has a graphic function capable of generating a video signal for displaying a image from input data such as EPG data and a video signal for displaying a web page from data for displaying the web page generated by the control unit 30.

Used as a work area in decompression of data compressed by the MPEG system and in generation of a signal for displaying an EPG, the DRAM 142 employed in the decoder 14 has a relatively large storage capacity enough for storing image data of the amount of at least 1 screen. That is to say, as a work area used for displaying information such as a web page, the DRAM 142 has a sufficiently large storage capacity.

Thus, the OSD processing unit 145 employed in the MPEG decoder 141 used to display an EPG and the DRAM 142 used in decompression of data and creation of a signal for displaying an EPG can also be used for displaying a web page. Therefore, by using the OSD processing unit 145 and the DRAM 142 in processing to display a web page as described above, the web page can be displayed without the need to provide the receiver 3 with a dedicated buffer memory and a dedicated graphic processing unit.

As a result, since there is no need to newly provide the receiver 3 with a dedicated buffer memory and a dedicated graphic processing unit in order to utilize a web page presented by a digital television broadcast, the cost of the receiver 3 can be prevented from rising.

Modified Version

In the embodiment described above, the browser for utilizing a web page is stored in advance in the flash memory unit 34 employed in the control unit 30. However, all users do not necessarily utilize a web page. There may be a number of users who are satisfied by being capable of watching reproduced television broadcast programs presented by a digital television broadcast.

For this reason, the browser is not included in the receiver 3 as a standard in order to prevent the cost of the receiver 3 from rising due to unneeded components such as unnecessary programs mounted on the receiver 3. In the case of a receiver with minimum components, a user who desires to use a web page can be provided with the external memory 100 stored the browser and the program to be executed for carrying out the processing like ones shown in FIG. 4 and FIG. 6.

That is to say, a user who desires to use a web page can prefer to purchase typically the external memory 100 stored the browser and other necessary programs. Then, by connecting the acquired external memory 100 to the external-memory interface 45 employed in the receiver 3, the browser and the other necessary programs can be loaded into the SDRAM 33 and the flash memory 34 employed in the control unit 30 to provide the receiver 3 with an additional function to utilize a web page. In this way, a web page can be utilized.

As described above, the demultiplexer 132 extracts a web page from a transport stream, transferring the web page to the SDRAM 33 employed in the control unit 30 to be temporarily stored therein. Then, by using the browser loaded from the external memory 100, data for displaying the web page can be generated and supplied to the OSD processing unit 145 employed in the MPEG decoder 141.

As described above, programs such the browser for utilizing a web page are loaded from the external memory 100 to provide the receiver 3 with an additional function. As a result, a web page can be displayed and utilized.

Also in the case of the modified version, by merely adding programs to be executed by the control unit 30, the receiver 3 is capable of displaying a web page and allowing the user to utilize the web page without any modification of the receiver 3 such as the need to provide the receiver 3 with a dedicated buffer memory and a dedicated graphic processing unit.

As described above, the embodiment exemplifies an application in which a web page presented by a digital television broadcast is played back and utilized by using the receiver 3. It should be noted, however, that the scope of the present invention is not limited to such an embodiment.

For example, a game program presented by a digital television broadcast can also be separated and extracted by the demultiplexer 132 and stored in the SDRAM 33 employed in the control unit 30 for execution by the control unit 30.

At that time, data for displaying images used in the game program is generated in a format acceptable to the OSD processing unit 145 employed in the MPEG decoder 141 by using image information included in the game program and supplied to the OSD processing unit 145. The OSD processing unit 145 is capable of playing back and displaying images to be displayed by the game program by using the graphic function and the DRAM 142 as a work area.

In addition, in the embodiment described above, the OSD processing unit 145 is incorporated in the MPEG decoder 141 in order to allow the OSD processing unit 145 and the decompression unit for decompressing data to be built in a single IC (Integrated Circuit).

It should be noted, however, that the implementation of the present invention is not limited to the embodiment. For example, the OSD processing unit 145 and the decompression unit can be implemented as separate circuits in the receiver. In this case, compressed data of a television broadcast program is supplied to the decompression unit while EPG data and display data output by the control unit 30 are supplied to the OSD processing unit 145. Also in this case, the DRAM 142 can be shared by the decompression unit and the OSD processing unit 145 as a component common to both the decompression unit and the OSD processing unit 145.

As described above, a web page handled by the embodiment is described in the HTML. It should be noted, however, that another language can of course be used. In this case, an analysis program corresponding to the language used for describing a web page is utilized to analyze, play back and output the web page.

What is claimed is:

1. A digital-television-broadcast receiving apparatus comprising:

a tuner for selecting a carrier-wave component including a signal of a broadcast program selected by a command issued by the user;

a front-end unit for demodulating said carrier-wave component selected by said tuner and outputting a transport stream;

a selected-program extracting unit for extracting compressed data of said broadcast program selected by said command issued by the user from said transport stream output by said front-end unit;

a decompression unit for decompressing said compressed data extracted by said selected-program extracting unit and for outputting a signal for presenting said selected broadcast program;

a graphic processing unit for generating a signal for presenting a image based on input data by conversion of said input data into display data such as characters, figures and symbols provided in advance; and a working memory with a storage capacity large enough for storing image data of the amount of at least 1 screen to be shared by said decompression unit and said graphic processing unit as a storage unit common to said decompression unit and said graphic processing unit wherein:

said selected-program extracting unit is capable of extracting presentation information included in said transport stream in accordance with a command issued by said user;

a data converting unit receives said presentation information extracted by said selected-program extracting unit, converts said presentation information into input data with a format acceptable to said graphic processing unit and supplies said input data to said graphic processing unit; and said graphic processing unit generates image data for presenting images for said presentation information from said input data generated by said data converting unit by using said working memory as a work area.

2. A digital-television-broadcast receiving apparatus according to claim 1 wherein said front-end unit carries out demodulation and error correction.

3. A digital-television-broadcast receiving apparatus according to claim 1, wherein:

said transport stream includes multiplexed program-table data for displaying a program table showing a plurality of broadcast programs multiplexed in said transport stream;

said selected-program extracting unit extracts said program-table data from said transport stream in accordance with a command issued by the user and supplies said program-table data to said graphic processing unit; and said graphic processing unit converts said program-table data into display in order to generate image data for displaying said program table.

4. A digital-television-broadcast receiving apparatus according to claim 1, wherein:

said presentation information is generated in a predetermined language; and said data converting unit carries out processing to analyze said presentation information to generate input data with a format acceptable to said graphic processing unit from said presentation information.

5. A digital-television-broadcast receiving apparatus according to claim 1, wherein:

said presentation information is a program including image information; and said data converting unit executes said program to generate input data with a format acceptable to said graphic processing unit by using said image information.

6. A digital-television-broadcast receiving apparatus according to claim 1, 2, 3 or 4, further having:

a connector for connecting an external memory; and an interface circuit for fetching information from said external memory connected to said connector by way of said connector, wherein said data converting unit executes a program for generating input data with a format acceptable to said graphic processing unit from said presentation information extracted by said selected-program extracting unit with said program loaded from said external memory connected to said connector in order to generate said input data.

7. A digital-television-broadcast receiving apparatus according to claim 6, wherein said external memory can be connected to and disconnected from said interface circuit.

8. A digital-television-broadcast receiving apparatus according to claim 6, wherein said external memory is a flash memory.

9. A digital-television-broadcast receiving apparatus according to claim 6, wherein said external memory can be mounted on and dismounted from electronic equipment of variety of types and allows data stored therein to be rewritten.

* * * * *

UNITED STATES PATENT AND TRADEMARK OFFICE
CERTIFICATE OF CORRECTION

PATENT NO. : 6,380,984 B1
DATED : April 30, 2002
INVENTOR(S) : Inoue et al.

It is certified that error appears in the above-identified patent and that said Letters Patent is hereby corrected as shown below:

Column 6,
Line 2, "31N" should read -- 31n --.
Line 52, "31N accordance" should read -- 31n in accordance --.

Column 18,
Line 1, after "of" insert -- a --.

Signed and Sealed this

Fifth Day of November, 2002

Attest:

JAMES E. ROGAN
Attesting Officer
Director of the United States Patent and Trademark Office